C. B. WATTLES.
STEERING MECHANISM FOR AUTOMOBILES.
APPLICATION FILED AUG. 3, 1908.
959,978.  Patented May 31, 1910.
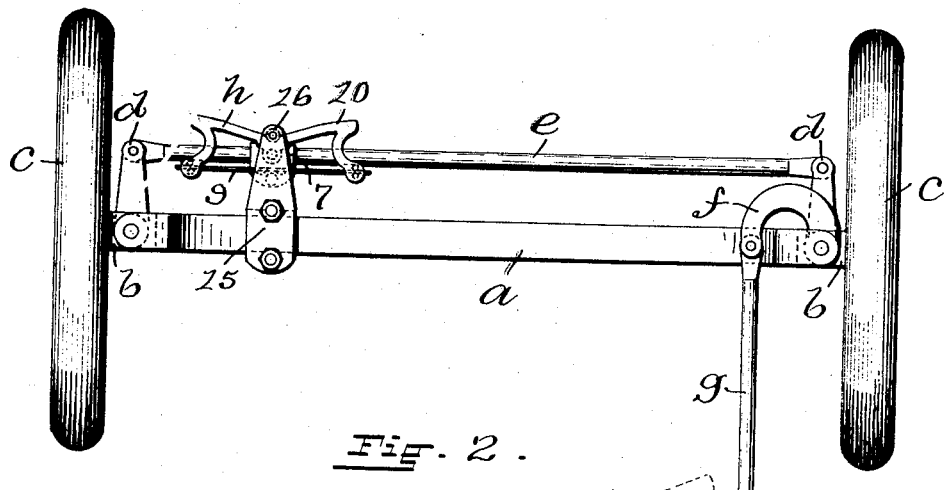
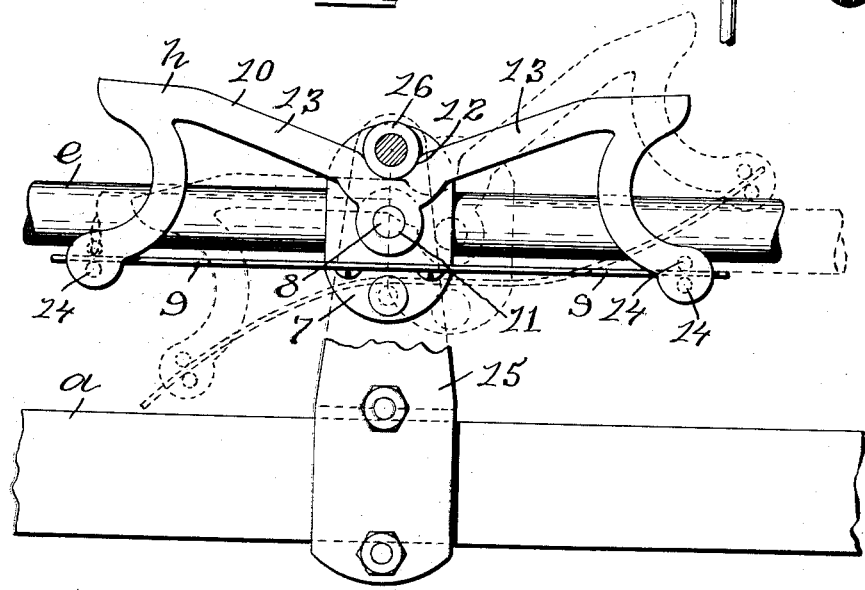

UNITED STATES PATENT OFFICE.

CYRA B. WATTLES, OF PROVIDENCE, RHODE ISLAND, ASSIGNOR TO PROVIDENCE GAS MOTOR COMPANY, OF PROVIDENCE, RHODE ISLAND, A CORPORATION OF RHODE ISLAND.

STEERING MECHANISM FOR AUTOMOBILES.

959,978.  Specification of Letters Patent.  Patented May 31, 1910.

Application filed August 3, 1908. Serial No. 446,573.

*To all whom it may concern:*

Be it known that I, CYRA B. WATTLES, a citizen of the United States, residing at Providence, in the county of Providence and State of Rhode Island, have invented a new and useful Improvement in Steering Mechanisms for Automobiles, of which the following is a specification.

This invention has reference to an improvement in automobiles and more particularly to an improvement in the steering mechanisms of automobiles.

In the running of automobiles as usually constructed the operator is obliged to have one or both hands firmly on the steering wheel while the machine is running to keep the machine in a straight line on the road. This brings a considerable and constant strain on the arms of the operator, which is further augmented by the tendency of the front wheels to turn sidewise or wabble and by the vibration of the front wheels transmitted through the steering mechanism and wheel to the operator, also where the operator is depended on entirely for the steering of the machine the steering wheel, through the front wheels striking a rut or obstruction, such as a rock on the road, is liable to be suddenly twisted out of the hands of the operator and the operator thereby loses control of the machine.

The object of my invention is to provide the steering mechanism of an automobile with a steering attachment adapted to yieldingly hold the front or steering wheels in a straight or central position and when the wheels are turned by hand within a predetermined radius to automatically return the wheels to their normal or straight position.

A further object of my invention is to reduce the vibration of the front wheels on the steering wheel.

Another object of my invention is to reduce wear on the front tires caused by the constant side movement or wabbling of the steering wheels through lost motion in the steering mechanism and the movement of the steering wheel to keep the machine in a straight line.

A still further object of my invention is to provide the steering mechanism of an automobile with a strong, compact and durable steering attachment at a minimum cost.

Figure 1 is a top plan view of the front axle, wheels and part of the steering mechanism of an automobile provided with my improved steering attachment. Fig. 2 is an enlarged top plan view of part of the front axle and steering mechanism with the steering attachment shown in its normal or central position in full lines and in the position it would assume in steering the machine to the right in broken lines. Fig. 3 is an enlarged detail view of one end of the pivoted cam lever, showing the means for operatively securing the ends of the whip spring to the ends of the lever.

In the drawings, $a$ indicates the front dead axle, $b\ b$ the live axles pivotally secured to the ends of the dead axle $a$, $c\ c$ the front wheels rotatably supported on the live axles $b\ b$, $d\ d$ forwardly-extending levers forming a part of the live axles $b\ b$, $e$ a connecting rod pivotally secured at each end to the free ends of the levers $d\ d$, $f$ a curved lever forming a part of or secured to the right hand live axle $b$, and $g$ a rod operatively connected to the steering wheel (not shown) of an automobile provided with my improved steering attachment $h$, as shown in Fig. 1.

The steering attachment $h$ consists of a fulcrum block 7 secured to the connecting rod $e$ and having a central upwardly-extending pivot stud 8 and a double whip spring 9 secured centrally to the back of the block 7 parallel with the rod $e$, a double cam lever 10 pivotally secured at its center to the top of the block 7 by the fulcrum stud 8 extending through a central hole 11 in the lever and having a central notch 12 in its outer edge, the oppositely-disposed cam arms 13 13 extending outwardly at an angle from the notch 12, each arm 13 having the downwardly-extending pins 14 14 straddling the free ends of the whip spring 9, and an arm 15 adjustably secured to the dead axle $a$ or any fixed part of the machine and having a roll 16 rotatably secured to the forward end of the arm in a position to engage with the notch 12 in the lever 10, as shown in full lines in Fig. 2.

In the operation of the attachment the front wheels $c\ c$ of the machine are held in a straight line, under spring tension, by the roll 16 on the fixed arm 15 engaging with the notch 12 in the cam lever 10 against any of the usual irregularities or obstructions in the road, thereby reducing the vibrations of the wheels on the steering mechanism to a minimum and removing the strain from the arms of the operator, also by holding the front wheels in a straight line when not required to steer the machine prevents wabbling of the wheels and reduces wear on the tires. A slight movement of the steering wheel when required to keep the machine in the road will move the notch 12 partly out of engagement with the roll 16 when the lever 10 through the tension of the spring 9 will automatically force the notch into full engagement with the roll and bring the wheels back into a straight line. When a greater movement of the steering mechanism is required to steer the machine to the right the notch 12 is moved out of engagement with the roll 16 and the lever 10 forced into approximately the position, as shown in broken lines in Fig. 2, against the tension of the spring 9. The roll 16 now runs free on the edge of the arm 13, the steering attachment is practically thrown out of engagement and the machine steered by the steering wheel in the usual way. When steering to the left the roll 16 runs free on the opposite arm 13 and the lever 10 assumes an opposite position to that shown in broken lines in Fig. 2.

Having thus described my invention, I claim as new and desire to secure by Letters Patent;—

1. A steering attachment for automobiles comprising in combination with an axle, and a connecting rod, a base block secured on said connecting rod, a bi-branched member pivoted on said base-block, means to oppose the rotation of said member and means to tilt said member against the pressure of said opposing means.

2. A steering attachment for automobiles, comprising in combination with an axle and a connecting rod, a base-block, secured on said connecting rod, an armed member pivoted on said base-block, resilient means fixed on said block and in engagement with said arms for maintaining them in a normal state of equilibrium and means to tilt said arms in opposition to said resilient means.

3. A steering attachment for automobiles comprising in combination with an axle and a connecting rod, a base-block secured on said connecting rod, an armed member centrally pivoted on said base-block, means for locking said armed member in a central or balanced position, and resilient means for returning said member to the said normally locked or central position.

4. A steering attachment for automobiles comprising in combination with an axle and a connecting rod, a base-block secured on said connecting rod, an armed member centrally pivoted on said base-block, means for locking said armed member in a central or balanced position, and resilient means in connection with said arms and secured to said base-block.

5. A steering attachment for automobiles comprising, in combination with an axle and a connecting rod, a base-block secured on said connecting rod, a member pivoted on said base-block, means for yieldingly maintaining said member in a central balanced position and means coacting with said last means for yieldingly locking said member in its central position.

6. A steering attachment for automobiles comprising a spring element operatively connected with the steering mechanism of the machine, a pivoted member operatively connected with the spring element and having a central notch, an arm secured to a fixed portion of the machine and a roll on the arm adapted to engage with the notch in the pivoted member.

7. A steering attachment for automobiles comprising a fulcrum block secured to a movable member of the steering mechanism of the machine, a spring element secured to the fulcrum block, a pivoted member on the fulcrum block having a central notch and operatively connected with the spring element, an arm adjustably secured to a fixed part of the machine and a roll on the arm adapted to engage with the notch in the pivoted member.

8. A steering attachment for automobiles comprising a fulcrum block secured to a movable member of the steering mechanism of the machine, a pivot stud on the fulcrum block, a member pivotally secured to the fulcrum block by the pivot stud and having a central notch and oppositely-disposed cam arms, a double whip spring secured centrally to the fulcrum block, means for operatively connecting the pivoted member with the whip spring, an arm adjustably secured to the fixed member of the machine, and a roll on the arm in a position to engage with the notch in the pivoted member.

9. A steering attachment for automobiles comprising a fulcrum block secured to the rod connecting the front wheels of the machine, a stud on the fulcrum block, a member pivotally secured to the stud and having a central notch and outwardly-extending inclined arms, a double whip spring secured centrally to the fulcrum block in a position to engage with the arms of the pivoted member, an arm adjustably secured to the dead axle of the machine, and a roll on the arm in a position to engage with the notch in the pivoted member.

In testimony whereof I have signed my name to this specification in the presence of two subscribing witnesses.

CYRA B. WATTLES.

Witnesses:
 ADA E. HAGERTY,
 J. A. MILLER.